UNITED STATES PATENT OFFICE.

HIRAM SAUNDERS, OF CHESTER, ASSIGNOR TO EDWARD A. PRICE, OF MEDIA, PENNSYLVANIA.

IMPROVEMENT IN COMPOSITIONS FOR PAVING.

Specification forming part of Letters Patent No. 119,476, dated October 3, 1871.

*To all whom it may concern:*

Be it known that I, HIRAM SAUNDERS, of the city of Chester, county of Delaware, and State of Pennsylvania, have invented a certain Composition to be used for Paving and other useful or ornamental purposes, of which the following is a specification:

The nature of my invention consists in compounding chalk, brimstone, bluestone, iron cuttings or slagging, and simple sand, gravel, or coal-ashes with a mixture of resin, pitch, and gas-tar in a fluid state.

To prepare about four cubic feet of the composition take, say, seven pounds of resin, nine pounds of pitch, and one gallon of gas-tar, and boil thoroughly, to which add about one-quarter of a pound of bluestone; then take of sand, gravel, and coal-ashes, in equal proportions, or either of them alone, say, three cubic feet; lime, one quarter of the above; chalk, one pound; brimstone, a quarter of a pound; and iron cuttings or slagging, twenty pounds; all of which is to be pulverized and heated in a pan. The mixture of resin, pitch, gas-tar, and bluestone is, in a heated state, thoroughly mixed with the pulverized material. The whole composition is then firmly compressed into hot or oiled molds of any desired form, either by hand or by suitable machinery. The result is the production of an artificial stone which hardens as soon as cold, and is then immediately ready for use in the paving of streets and sidewalks, and for other useful or ornamental purposes.

I claim as my invention—

A composition, consisting of a mixture of lime, chalk, brimstone, bluestone, iron cuttings or slagging, and simple sand, gravel, or coal-ashes, compounded with a mixture of resin, pitch, and gas-tar in a fluid state, substantially in the proportions and for the purposes set forth.

HIRAM SAUNDERS.

Witnesses:
   ELLA H. LINDSAY,
   LOUISE W. PRICE. (92)